United States Patent
Antal et al.

(10) Patent No.: US 6,587,472 B1
(45) Date of Patent: Jul. 1, 2003

(54) FAIR CHANNEL ALLOCATION PROTOCOL FOR DTM NETWORKS

(75) Inventors: Csaba Antal, Kiskunlacháza (HU); József Molnár, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/271,978

(22) Filed: Mar. 19, 1999

(30) Foreign Application Priority Data

Mar. 20, 1998 (GB) .............................................. 9806109

(51) Int. Cl.⁷ .................................................. H04J 3/00
(52) U.S. Cl. ....................................... 370/442; 370/458
(58) Field of Search ................................ 370/357, 360, 370/362, 400, 401, 402, 403, 431, 437, 442, 450, 458, 464, 465, 498; 709/227, 253

(56) References Cited

U.S. PATENT DOCUMENTS

| | | | |
|---|---|---|---|
| 1,436,932 A | 11/1922 | Allan | |
| 1,932,324 A | 10/1933 | Rowley | |
| 2,352,996 A | 7/1944 | Rider | |
| 2,384,342 A | 9/1945 | Rider | |
| 2,713,916 A | 8/1955 | Muckenfuss | |
| 2,822,052 A | 2/1958 | Herkimer | |
| 3,098,527 A | 7/1963 | Allen | |
| 3,589,455 A | 6/1971 | Juliano | |
| 3,595,318 A | 7/1971 | Merdinyan | |
| 3,727,878 A | 4/1973 | Willms | |
| 4,570,719 A | 2/1986 | Wilk | |
| 4,750,171 A | 6/1988 | Kedar et al. | |
| 4,949,395 A | 8/1990 | Rydbeck | |
| 5,081,623 A | 1/1992 | Ainscow | |
| 5,295,503 A | 3/1994 | Meyer | |
| 5,402,422 A | 3/1995 | Liu et al. | |
| 5,439,028 A | 8/1995 | Meyer | |
| 5,463,629 A | 10/1995 | Ko | |
| 5,471,474 A | 11/1995 | Grobicki et al. | |
| 5,946,315 A | * 8/1999 | Ramfelt et al. | ............. 370/403 |
| 5,982,747 A | * 11/1999 | Ramfelt et al. | ............. 370/224 |
| 5,982,780 A | * 11/1999 | Bohm et al. | ............. 370/450 |
| 6,108,338 A | * 8/2000 | Ramfelt et al. | ............. 370/403 |
| 6,112,230 A | * 8/2000 | Monch et al. | ............. 709/208 |
| 6,157,656 A | * 12/2000 | Lindgren et al. | ............. 370/458 |

FOREIGN PATENT DOCUMENTS

| | | |
|---|---|---|
| EP | 0 364 638 A1 | 4/1990 |
| EP | 0 477 659 A1 | 4/1992 |
| EP | 0 726 661 A2 | 8/1996 |
| GB | 2 310 119 A | 8/1997 |
| WO | 97/24846 | 7/1997 |
| WO | 97/36402 | 10/1997 |

OTHER PUBLICATIONS

Per Lindgren, "A Multi–Channel Network Architecture Based on Fast Circuit Switching", Royal Institute of Technology, Stockholm, Sweden, ISRN KTH/IT/R–96/08–SE, May 1996, pp. 1–180.

Grinnell Corporation, Dry Pipe Valves, 4 & 6 Inch, TD 107, 1/84, pp. 1–6.

(List continued on next page.)

Primary Examiner—Melvin Marcelo

(57) ABSTRACT

A dynamic synchronous transfer mode network includes first and second unidirectional buses 2 and 4, and a plurality of nodes, 0 to N−1. Each node includes a mechanism for selecting a bus. When a first node wishes to initiate a call with a second node, the selected bus is used to communicate with the second node. Each node includes a processor for calculating, for the selected bus, a ratio based on the number of previous reservations made by the node and the number of previous reservations relating to calls to or from the node. If the ratio is below a threshold, then a channel reservation device reserves one or more channels for a call. If the ratio is above the threshold, then the device requests a second node to reserve one or more channels for the call. This overcomes unfair operation of the network caused by the dual-bus topology.

15 Claims, 3 Drawing Sheets

OTHER PUBLICATIONS

Grinnell Corporation, Dry Pipe Valve Accelerator, TD109, 1/90, pp. 1–8.

Central Sprinker Company, Dry Pipe Valve AF & AG 12/92, pp. 1–12.

Reliable, Model A Dry Pilot Line Actuator, Bulletin 504G, 5/97, pp. 1 and 2.

Reliable, Model B1 Accelerator With Integral Accelo–Check, Bulletin 322L, 8/96, pp. 1–6.

Reliable, Model D Dry Pipe Valve, Bulletin 350J, 12/96, pp. 1–8.

Reliable, Models B & BX Delug Valves, Bulletin 501S, 8/97, pp. 1–12.

Reliable, Supertrol Double Interlock Preaction System 4 and 6 inch, Bulletin 714C, pp. 1–8.

Viking, The leader in dry pipe valve design just raised the standard, again, pp. 1–4.

Star Sprinker Corporation, Product Data: Dry Pipe Valves, pp. 1–5.

* cited by examiner

STRUCTURE OF DTM BUS

PROBABILITY OF ACTING AS SENDER, RECEIVER AND RESERVER ON ONE OF THE UNDIRECTIONAL BUSES ACCORDING TO THE PRIOR ART

PROBABILITY OF ACTING AS SENDER, RECEIVER AND RESERVER ON ONE OF THE UNDIRECTIONAL BUSES ACCORDING TO THE PRESENT INVENTION

FAIR CHANNEL ALLOCATION PROTOCOL FOR DTM NETWORKS

FIELD OF THE INVENTION

The invention relates to a dynamic synchronous transfer mode (DTM) network, and in particular to a method of operation thereof, and a node for use therein, which, in preferred embodiments, overcome the unfair operation of the network caused by the dual-bus topology and hence the inherently asymmetric nature of the network.

BACKGROUND

Dynamic synchronous transfer mode (DTM) is an attempt to build the next generation of networking technologies on fast circuit switching basis.

The operation of DTM is based on multirate and either unicast or broadcast channels. It is designed for a unidirectional medium with multiple access. The total medium capacity is shared by all connected nodes. Previous proposals and implementations are based on dual-bus topology. The architecture can be extended to include a large number of connected buses using switching nodes.

FIG. 1 shows the general structure of a dual-bus DTM network. The most important elements of the DTM network are the nodes and the hosts. Nodes are networking devices connected to the dual bus. Hosts are end-devices with a simple interface that connects them to a node. Host-host communication is based on the assistance of nodes. Nodes are responsible for resource allocation, connection establishment and release along the bus.

The total communication channel on the physical shared medium is realised by a time division multiplexing scheme. The total capacity of the bus is divided into cycles of 125 microseconds, which are further divided into slots. A slot consists of a 64-bit data-word and some additional management bits. The sequence of slots at the same position in successive cycles is called a DTM channel.

There are two types of slots (and thereby two DTM channels); data and static slots. Data slots are used for data transfer. The number of data channels specifies the bit-rate of a DTM connection. There is a token for each DTM channel, which is assigned to one of the nodes. Both free and used channels are assigned to nodes. Each channel has exactly one owner at a time. If a node has the right to use a channel, then it has full control of it; it can setup a connection on it, send data within the connection, release a connection using the channel, or give the channel ownership to another node.

According to the known DTM protocol, the sender node is responsible for channel reservation regardless of whether or not it is the initiator of a call. This is the most obvious solution if point-to-multipoint (multicast) connections are used.

However, consider the scenario where nodes generate point-to-point calls (as senders) with the same statistical characteristics. The destination of the calls (receiver) is chosen with uniform distribution, ie. there is an equal probability that a node sends data to any of the nodes on the bus.

In this scenario, though nodes generate the same amount of traffic to the dual-bus, the load distribution on the unidirectional buses will not be uniform.

If we consider only one of the unidirectional buses: a node at the end of the bus cannot transmit data, therefore, it has no need to reserve channels; a node at the beginning of the bus transmits all its traffic to the same bus, therefore, it needs to reserve twice the average number of channels. The blocking probability for a node, and the average setup time for the node will depend on the number of reservations made by the node. As a result, this known protocol leads to unfair treatment of the nodes.

SUMMARY OF THE INVENTION

According to a first aspect of the invention, there is provided a method of operation of a dynamic synchronous transfer mode network comprising a plurality of buses, wherein, when a first node wishes to initiate a call with a second node:

the first node selects a bus in the network for communication with the second node;

the first node calculates, for the selected bus, a ratio based on the number of previous reservations made by the first node and the number of previous reservations relating to calls to or from the first node; and if the calculated ratio is below a threshold, the first node reserves one or more channels for the call; and if the calculated ratio is above the threshold, the first node requests the second node to reserve one or more channels for the call.

This has the advantage that the calculated ratio can be controlled for each node, such that the ratios for each node in the network, and hence the blocking probabilities, and the average setup times, for the nodes, can be made similar.

Preferably, the network is a dual bus network, and each bus is unidirectional.

Preferably, the ratio calculated by the first node is the ratio of the number of channels previously reserved by the first node to the number of previous channels used for calls to or from the first node.

This has the advantage that it is the number of reserved channels which determines the blocking probability.

Preferably, the threshold for the calculated ratio is 50%.

This has the advantage that the ratio can in principle be controlled to 50% for each node, which means that the blocking probabilities, and the average setup times, for all nodes, can be made the same.

Preferably, when the first node requests the second node to reserve one or more channels for the call, it does so by sending a Query message to the second node.

This has the advantage that this message already exists in the existing DTM protocol.

According to a second aspect of the invention, there is provided a node for use in a dynamic synchronous transfer mode network, wherein the node comprises:

a selecting device for selecting a bus, when the node wishes to initiate a call with a second node, the selected bus being for communication with the second node;

a processor for calculating, for the selected bus, a ratio based on the number of previous reservations made by the node and the number of previous reservations relating to calls to or from the node; and a channel reservation device, for, if the calculated ratio is below a threshold, reserving one or more channels for the call; and for, if the calculated ratio is above the threshold, requesting for the second node to reserve one or more channels for the call.

According to a third aspect of the invention, there is provided a dynamic synchronous transfer mode network, comprising a plurality of nodes and a plurality of buses joining the nodes, wherein each node comprises:

a selecting device for selecting a bus, when the node wishes to initiate a call with a second node, the selected bus being for communication with the second node;

a processor for calculating, for the selected bus, a ratio based on the number of previous reservations made by the node and the number of previous reservations relating to calls to or from the node; and a channel reservation device, for, if the calculated ratio is below a threshold, reserving one or more channels for the call; and for, if the calculated ratio is above the threshold, requesting the second node to reserve one or more channels for the call.

DETAILED DESCRIPTION

As described previously, FIG. 1 shows the general structure of a DTM network. The network is a dual bus network, having first and second unidirectional buses 2, 4 respectively. The network includes a plurality N of nodes 6, marked Node 0, Node 1, ..., Node x, ..., Node N−1. Each node has one or more hosts 8 connected thereto. As is conventional, in a DTM network, the nodes 6 are networking devices connected to the dual bus. The hosts 8 are end-devices with a simple interface that connects them to a node. Host-host communication is based on the assistance of nodes. Nodes are responsible for resource allocation, connection establishment and release along the bus. The total communication channel on the physical shared medium is realised by a time division multiplexing scheme. The total capacity of each bus is divided into cycles of 125 microseconds, which are further divided into slots. A slot consists of a 64-bit data-word and some additional management bits. The sequence of slots at the same position in successive cycles is called a DTM channel. The present invention will be described with reference to an exemplary network having 100 nodes, but it will be appreciated that the network may have any convenient number of nodes.

More information about DTM can be found in the document by P. Lindgren "A Multi-Channel Network Architecture Based on Fast Circuit Switching", PhD. thesis, Royal Institute of Technology, Stockholm, Sweden, ISRN KTH/IT/R-96/08-SE.

Figure 2:
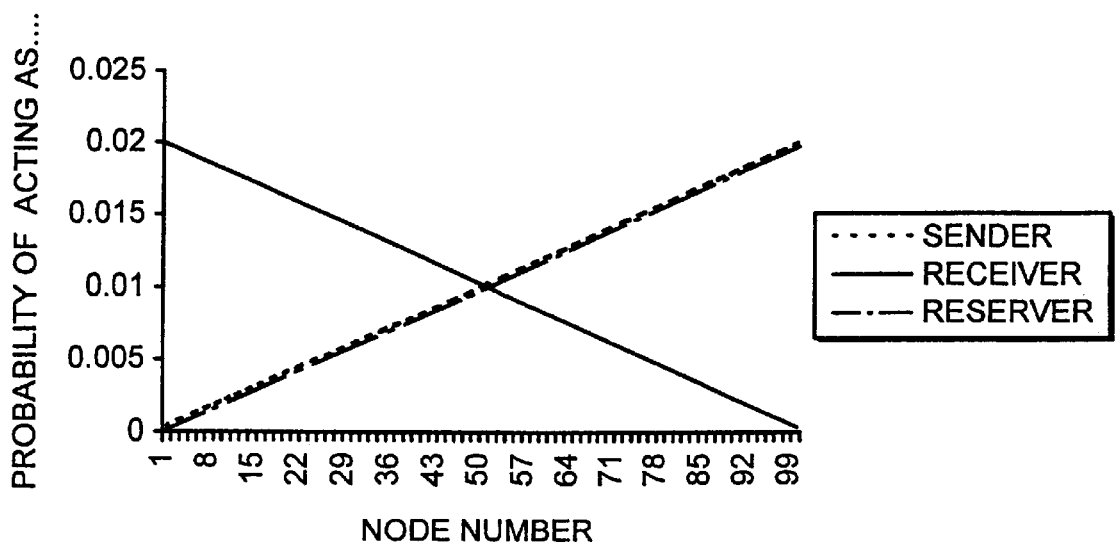
FIG. 2 shows the probability of acting as sender, receiver and reserver on one of the unidirectional buses according to the prior art.

FIG. 2 shows, for this exemplary network, the probability that each node will act as either sender or receiver for transmissions made on one of the unidirectional buses. It will be apparent that a node at the end of a bus will not wish to transmit any data on that bus, because there will be no other nodes to transmit such data to. Similarly, a node at the beginning of a bus will only be able to transmit data on that bus, and so it will transmit twice the average amount of data on that bus. Making the assumption that the distribution of traffic is regular, namely that, from a node, the other nodes are all equally likely destinations for the transmission of data, the probability of a node acting as a sender on a bus, and the probability of a node acting as a receiver on a bus, are linear functions of the position of the node on the bus. The probability of a node acting as a sender on a bus increases linearly with the proximity of the node to the beginning of the bus, and the probability of a node acting as a receiver on a bus increases linearly with the proximity of the node to the end of the bus.

Figure 1:
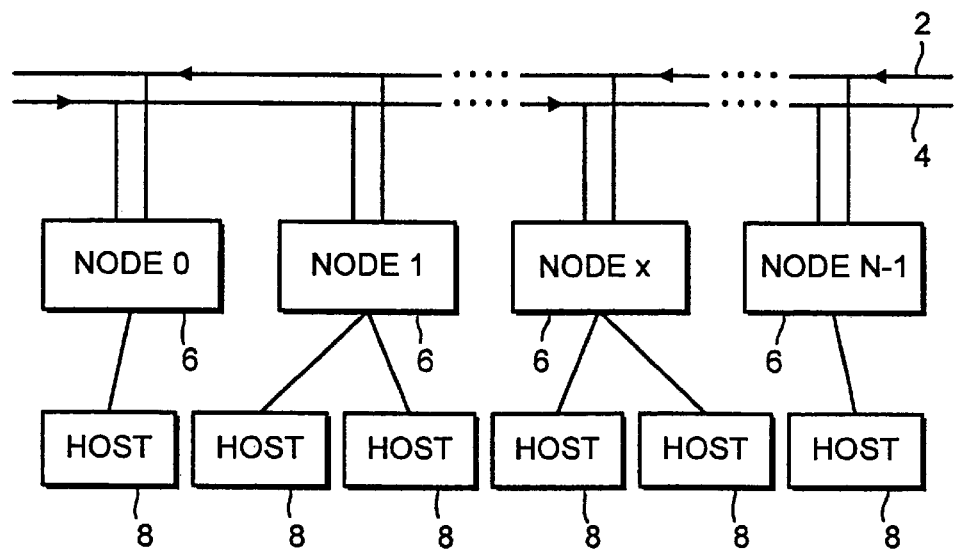
FIG. 1 shows the structure of a DTM bus.

In a conventional network, in which the sender is always responsible for reservation of the required channel or channels for the given call, therefore, the probability of a given node acting as a reserver on a given bus mirrors the probability of the node acting as a sender on the bus, as shown in FIG. 1.

Figure 3:
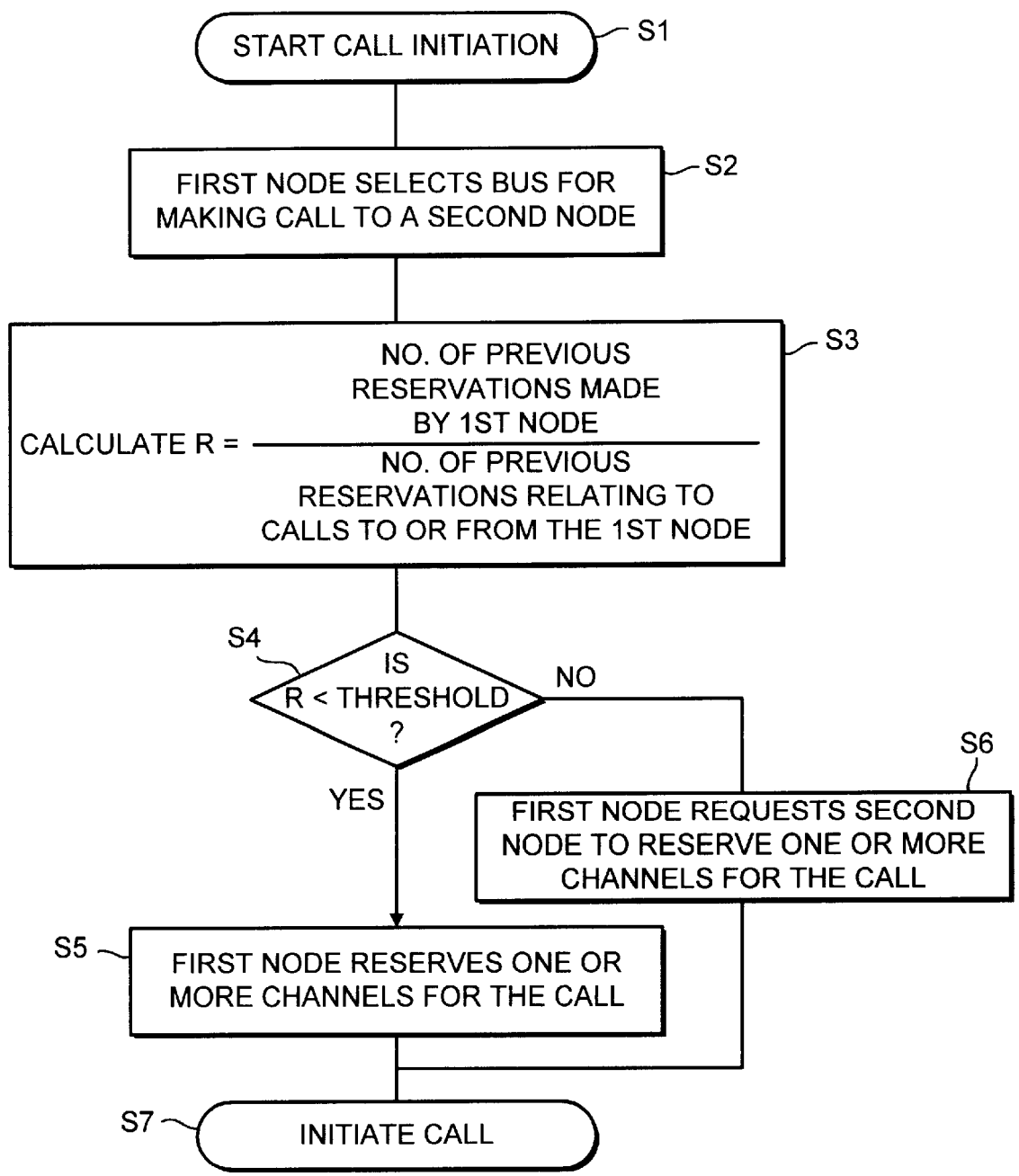
FIG. 3 is a flow diagram showing the steps involved in initiating a call on a DTM dual-bus network according to the present invention.

In accordance with the invention, as FIG. 3 shows, the sender is not always responsible for reservation of the required channel or channels for the given call. Indeed, either the sender or receiver may be responsible. The invention is described with reference to a point-to-point channel, with which it provides particular advantages. At step Si of the flow chart of FIG. 3, the process of call initiation is started. A first node determines that it wishes to make a call to a specific second node, and whether it will be acting as sender or receiver for the call.

At step S2, the first node selects the bus on which the call will be made. In the case of a dual-bus network with unidirectional buses, this is a simple matter of choosing the bus which sends data in the correct direction from sender to receiver.

At step S3, the first node calculates a ratio R, in respect of its own use of the selected bus, which it uses to determine whether it will itself reserve the required channels. In general terms, the ratio R is based on the number of previous reservations made by the first node and the number of previous reservations relating to calls to or from the first node.

Preferably the ratio R is given by:

$$R = \frac{\text{(number of channels reserved by first node)}}{\text{(number of channel reservations where first node was one of the parties)}}$$

In calculating the ratio R, preferably only channels reserved within a specific immediately preceding time period will be considered.

At step S4, it is determined if the ratio R is less than a threshold value, preferably 50%. If so, the process passes to step S5, and the first node reserves the required number of channels for the call. In this case, the channel reservation procedure can be rather similar to the conventional channel reservation procedure. The first node sends an Announce message (see the document by P. Lindgren mentioned earlier) to the second node.

If the ratio R is greater than the threshold value, the process passes to step S6, and the first node requests the second node to reserve the required number of channels for the call. In this case, the channel reservation procedure uses the Query and Announce messages (see the document by P. Lindgren mentioned earlier) which are used in the conventional channel reservation procedure when a receiver is initiating a call. The first node sends a Query message to the second node, indicating the necessary call information, such as the required bus and the number of slots, and preferably also which party is to be receiver and which sender. The second node attempts to reserve the required channel or channels and, if successful, sends an Announce message to the first node.

In either case, in step S7, the call then proceeds when the required channels have been reserved.

Figure 4:
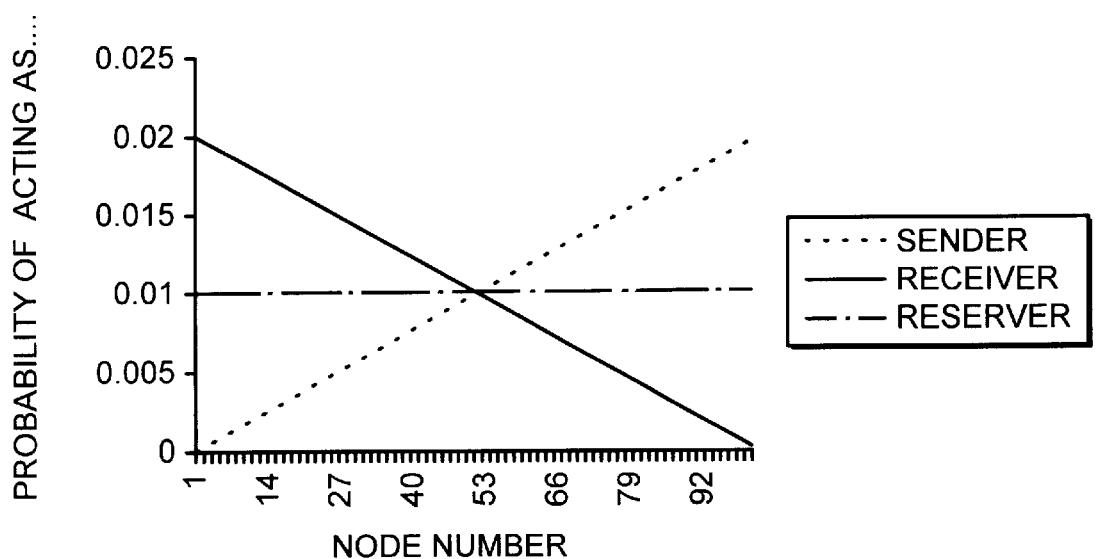
FIG. 4 shows the probability of acting as sender, receiver and reserver on one of the unidirectional buses according to the present invention.

As FIG. 4 shows, in use of the invention, even though the probability of a node acting as a sender on a bus increases linearly with the proximity of the node to the beginning of the bus, and the probability of a node acting as a receiver on a bus increases linearly with the proximity of the node to the end of the bus, the probability of each bus acting as a reserver tends to become equal. In other words, if two nodes participate in the same number of channels, they will tend to have made the same number of channel reservations. Since it is the load on the node which determines the blocking probability and average setup time at a node, these factors will tend to become equal, thereby increasing the fairness of operation of the network.

There are therefore disclosed a method of operation of a network, and a node therefor, which improve the fairness of operation of the network, compared with conventional dtm networks.

What is claimed is:

1. A method of operation of a dynamic synchronous transfer mode network comprising a plurality of buses, wherein, when a first node wishes to initiate a call with a second node:

the first node selects a bus in the network for communication with the second node;

the first node calculates, for the selected bus, a ratio based on the number of previous reservations made by the first node and the number of previous reservations relating to calls to or from the first node; and if the calculated ratio is below a threshold, the first node reserves one or more channels for the call; and if the calculated ratio is above the threshold, the first node requests the second node to reserve one or more channels for the call.

2. A method as claimed in claim 1, wherein the network is a dual bus network.

3. A method as claimed in claim 1, wherein each bus is unidirectional.

4. A method as claimed in claim 3, wherein the first node selects a bus in the network for communication with the second node based on the relative locations of the first and second nodes on the bus, and on whether the first node will act as sender or receiver.

5. A method as claimed in claim 1, wherein the ratio calculated by the first node is the ratio of the number of channels previously reserved by the first node to a number of channels previously used for calls to or from the first node.

6. A method as claimed in claim 1, wherein the threshold for the calculated ratio is 50%.

7. A method as claimed in claim 1, wherein, when the first node requests the second node to reserve one or more channels for the call, it does so by sending a Query message to the second node.

8. A node for use in a dynamic synchronous transfer mode network, wherein the node comprises:

a selecting device for selecting a bus, when the node wishes to initiate a call with a second node, the selected bus being for communication with the second node;

a processor for calculating, for the selected bus, a ratio based on the number of previous reservations made by the node and the number of previous reservations relating to calls to or from the node; and a channel reservation device, for, if the calculated ratio is below a threshold, reserving one or more channels for the call; and for, if the calculated ratio is above the threshold, requesting for the second node to reserve one or more channels for the call.

9. A node as claimed in claim 8, wherein the selecting device for selecting a bus in a dual bus network makes a selection based on the relative locations of the first and second nodes on the bus, and on whether the first node will act as sender or receiver.

10. A node as claimed in claim 8, wherein the ratio calculated by the processor is the ratio of the number of channels previously reserved by the node to a number of channels previously used for calls to or from the node.

11. A node as claimed in claim 8, wherein the threshold for the calculated ratio is 50%.

12. A node as claimed in claim 8, wherein the channel reservation device comprises a query device for sending a Query message to the second node, when the node requests the second node to reserve one or more channels for the call.

13. A dynamic synchronous transfer mode network, comprising a plurality of nodes and a plurality of buses joining the nodes, wherein each node comprises:

a selecting device for selecting a bus, when the node wishes to initiate a call with a second node, the selected bus being for communication with the second node;

a processor for calculating, for the selected bus, a ratio based on the number of previous reservations made by the node and the number of previous reservations relating to calls to or from the node; and a channel reservation device, for, if the calculated ratio is below a threshold, reserving one or more channels for the call; and for, if the calculated ratio is above the threshold, requesting the second node to reserve one or more channels for the call.

14. A network as claimed in claim 13, wherein the network is a dual bus network.

15. A network as claimed in claim 13, wherein the buses are unidirectional.

* * * * *